United States Patent [19]
Schniedermeier

[11] Patent Number: 4,932,820
[45] Date of Patent: Jun. 12, 1990

[54] NAIL WITH DIFFERENTIAL HOLDING CAPABILITIES ALONG ITS SHANK

[75] Inventor: Henry W. Schniedermeier, Niles, Ill.

[73] Assignee: Illinois Tool Works, Inc., Chicago, Ill.

[21] Appl. No.: 405,247

[22] Filed: Sep. 11, 1989

[51] Int. Cl.$^5$ .................. F16B 15/02; F16B 15/08
[52] U.S. Cl. .................. 411/455; 411/482; 411/922; 403/408.1
[58] Field of Search .............. 411/455, 456, 446, 482, 411/922; 403/408.1

[56] References Cited

U.S. PATENT DOCUMENTS

| | | | |
|---|---|---|---|
| 356,549 | 1/1887 | Raymond, II | 411/456 |
| 387,380 | 8/1888 | Thayer | 411/456 |
| 1,948,889 | 2/1934 | Simon | 411/455 |
| 2,093,610 | 9/1937 | Kraemer | 411/455 |
| 2,650,032 | 8/1953 | Godfrey | 411/455 |

FOREIGN PATENT DOCUMENTS 873960  8/1961  United Kingdom ................ 411/455

*Primary Examiner*—Neill R. Wilson
*Attorney, Agent, or Firm*—Schwartz & Weinrieb

[57] ABSTRACT

A nail designed to be initially driven through a first board, and into a second board so as to assemble the boards with the boards engaging each other, and to be subsequently pulled or removed, as by means of a crowbar or a claw upon a hammer head, so as to disassemble the boards is disclosed as including a head and a shank with a pointed end. A relatively smooth portion of the shank extends axially from the pointed end for a substantial distance. A relatively rough portion, which is formed with annular, frustoconical rings defining annular grooves, extends axially from the relatively smooth portion toward the head for a distance approximately equal to the thickness of the first board. A relatively smooth portion extends axially between the relatively rough portion and the head. The nail has differential holding capabilities per unit length along its shank, when driven the wooden boards.

16 Claims, 1 Drawing Sheet

NAIL WITH DIFFERENTIAL HOLDING CAPABILITIES ALONG ITS SHANK

TECHNICAL FIELD OF THE INVENTION

This invention pertains to a nail with differential holding capabilities along its shank. The nail is useful particularly but not excusively in a temporary nailing appliction where the nail is to be later pulled.

BACKGROUND OF THE INVENTION

Temporary nailing applications exist in the construction industry, in the shipping industry, and in other industries. Typically, in such an application, a wooden structure is assembled with nails, which later are removed from the wooden structure when the structure is disassembled.

Thus, in the construction industry, it is common to assemble wooden forms, into which concrete for a building foundation is poured, with nails to be later removed from the wooden forms when it is desired to disassemble such forms. Also, in the shipping industry, it is common to assemble wooden shipping crates with nails to be later removed from the crates when it is desired to disassemble such crates.

Nails with so-called duples heads are known for such applications. A nail with a duplex head has an annular flange formed on its shank in axially spaced relation with respect to a first or outer head of the nail. The annular flange, which serves as a second or inner head, engages a workpiece, when the nail has been driven substantially but not completely into or through the workpiece, so as to prevent the nail from being driven further into or through the workpiece. The first or outer head and the portion of the shank defined between the annular flange and such head remain exposed. Thus, the nail can be easily pulled or removed, as by means of a crowbar or a claw provided upon a hammer head. The crowbar or the claw provided upon the hammer head can be easily inserted between the annular flange and the first or outer head.

Because of their duplex heads, such nails do not fit nail-feeding mechanisms of many pneumatically actuated or combustion-actuated nailing tools, as used for example, to drive conventional nails with single heads, unless substantial modifications are made to such mechanisms.

It would be very useful to have for temporary nailing applications, as described above, nails that would fit the nail-feeding mechanisms of such tools without substantial modifications being required to be made to such mechanisms.

SUMMARY OF THE INVENTION

This invention provides a nail to supplant a nail with a duplex head. The nail provided by means of this invention has a single head and fits nail-feeding mechanisms of many pneumatically actuated or combustion-actuated nailing tools, as mentioned above, without substantial modifications being required to be made to such mechanisms.

The nail provided by means of this invention has a shank defining an axis and having a pointed end. The shank has a relatively smooth portion extending axially from the pointed end. The relatively smooth portion terminates so as to be axially spaced from the head. The shank has a relatively rough portion extending axially from the relatively smooth portion toward the head. Thus, the relatively smooth and relatively rough portions noted above constitute means providing such nail with differential holding capabilities per unit length along its shank, when such nail is driven into wooden boards.

Preferably, the shank also has a second relatively smooth portion extending axially between the relatively rough protion and the head. Preferably, the first relatively smooth portion extending axially from the pointed end has an axial length greater than the combined axial lengths of the relatively rough portion and the second relatively smooth portion extending axially between the relatively rough portion and the head.

Preferably, the relatively rough portion is formed with a plurality of annular rings defining a plurality of annular grooves. The rings may be frusto-conical. The pointed end and the frusto-conical rings may point in opposite axial directions, as preferred, or in a common axial direction.

Thus, the nail provided by means of this invention is designed to be initially driven through a first board of a given thickness, and into a second board, so as to assemble the boards. Also, such nail is designed to be subsequently pulled or removed from the boards, as by means of a crowbar or a claw provided upon a hammer head, so as to disassemble the boards. When such nail is to be so utilized, the relatively rough portion should extend axially for a distance at least equal to the given thickness of the first board. Preferably, the relatively rough portion extends axially for a distance approximately equal to such thickness.

When it is to be so utilized, the nail provided by means of this invention can be initially driven through the first board, and into the second board while the first board engages the second board. Certain conditions should obtain. Thus, the relatively rough portion should extend through at least a substantial part of the given thickness of the first board. However, the relatively rough portion should not penetrate the second board to any substantial depth. Thus, the head remains spaced from the first board.

Accordingly, the boards are assembled to each other by such nail with the first board engaging the second board. The relatively rough portion tends to prevent the first board from separating from the second board and moving up the shank, toward the head, even though the head is spaced from the first board. However, such nail can be easily pulled or removed, as by means of a crowbar or a claw provided upon a hammer head, when it is desired to disassemble the boards.

BRIEF DESCRIPTION OF THE DRAWINGS

These and other objects, features, and advantages of this invention are evident from the following description of a preferred embodiment of this invention with reference to the accompanying drawings wherein like reference characters designate like or corresponding parts throughout the several views, and wherein.

DETAILED DESCRIPTION OF PREFERRED EMBODIMENTS

Before describing a nail constituting a preferred embodiment of this invention (FIGS. 1 and 3) and a nail constituting an alternative embodiment of this invention (FIG. 4) it is useful to describe a nail having a duplex head and exemplifying the prior art.

Figure 2:
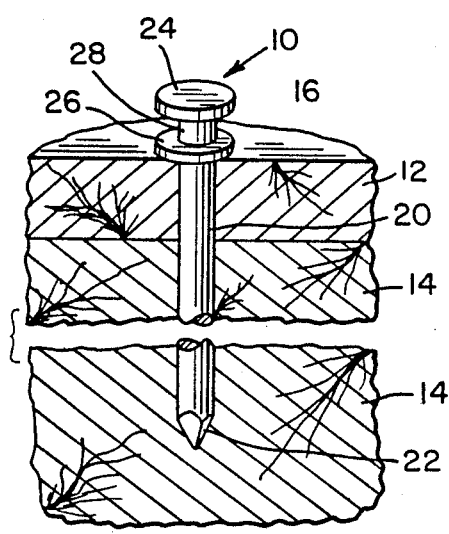
FIG. 2 on a slightly smaller scale is a similar view showing a wooden structure in which two boards are nailed together by means of a nail having a duplex head and exemplifying the prior art.

As shown in FIG. 2, a nail 10 exemplifying the prior art is used to a nail a first board 12 to a second board 14. The boards 12, 14, which are wooden boards, exemplify parts of a wooden form, into which concrete (not shown) is to be later poured, or parts of a wooden shipping crate. The nail 10 has a duplex head 16, as described below.

The nail 10 has a shank 20 defining an axis and having a pointed end 22. A first or outer head 24, which is circular, is formed upon the opposite end of the shank 20. An annular flange 26, which provides a second or inner head, is formed upon the shank 20 in axially spaced relation with respect to the head 24. A minor portion 28 of the shank 20 extends between the head 24 and the flange 26.

The nail 10 is designed to be driven through the first board 12, and into the second board 14 while the first board 12 engages the second board 14. Thus, when the nail 10 has been driven sufficiently, the flange 26 engages the first board 12 and prevents the nail 10 from being driven further. Since the head 24 and the shank portion 28 remain exposed, the nail 10 can be later pulled or removed by means of a prying tool (not shown) inserted between the head 24 and the flange 26.

Because of their duplex heads, nails such as the nail 10 do not fit the nail-feeding mechanisms (not shown) of many pneumatically actuated or combustion actuated nailing tools, such as for example, those used to drive conventional nails (not shown) with single heads, unless substantial modifications are made to such mechanisms.

Figure 1:
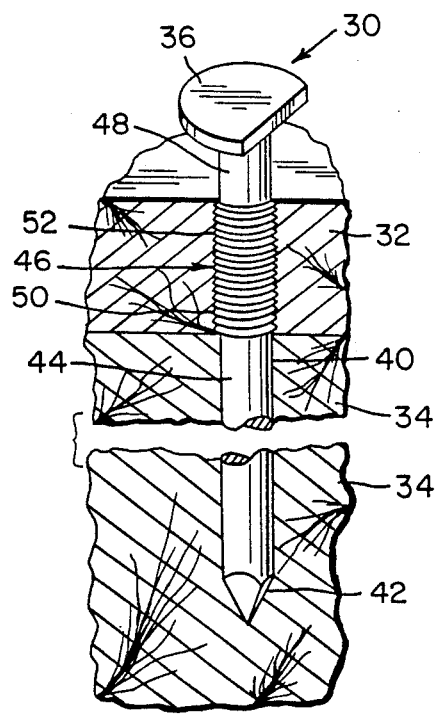
FIG. 1 is a partly sectioned, fragmentary, perspective view showing a wooden structure in which two boards are nailed together by means of a nail constituting a preferred embodiment of this invention.
Figure 3:
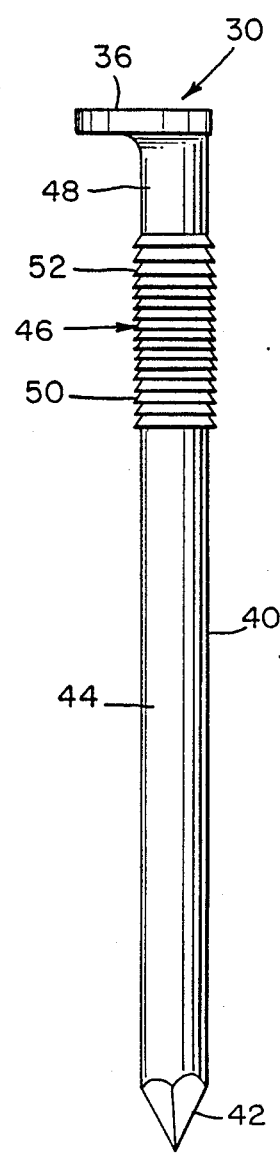
FIG. 3 on a slightly larger scale is an elevational view of the nail shown in FIG. 1.

As shown in FIGS. 1 and 3, a nail 30 constituting a preferred embodiment of this invention is used to nail a first board 32 to second board 34. The boards 32, 34, are similar to the boards 12, 14. The first board 32 has given thickness, such as, for example 0.75 inch, to which certain dimensions of the nail 30 are compared, as explained below.

The nail 30 has a single head 36, which is D-shaped. Such D-shaped heads, which may be also described as clipped heads, are common upon nails that have been collated so as to fit many pneumatically actuated or combustion-actuated nailing tools.

The nail 30 has a shank 40 defining a longitudinal and having a pointed end 42. The head 36 is formed at the opposite end of the shank 40.

The shank 40 has three distinct portions, namely a retatively smooth portion 44, a relatively rough portion 46, and a relatively smooth portion 48. The relatively smooth portion 44 and the relatively rough portion 46 provide the nail 30 with differential holding capabilities per unit length along the shank 40 when the nail 30 is driven into wooden boards, such as, for example, the boards 32, 34. The relatively rough portion 46 has greater holding power per unit length, as compared to the relatively smooth portion 44, when the nail 30 is driven into the wooden boards.

The relatively smooth portion 44, which extends axially from the pointed end 42, terminates so as to be axially spaced from the head 36 by means of a distance greater than the thickness of the first board 32. The relatively rough portion 46 extends axially from the relatively smooth portion 44, to the relatively smooth portion 48, for a distance approximately equal to the thickness of the first board 32. The relatively smooth portion 48 extends axially between the relatively rough portion 46 and the head 36 for a distance sufficent to permit a prying tool, such as, for example, (not shown) or a claw (not shown) upon a hammer head, to fit between the relatively rough portion 46 and the head 36.

In accordance with one example, the nail 30 including the head 36, the shank 40, and the pointed end 42 has a overall axial length of approximately 3.375 inches and a shank diameter of approximately 0.129 inches. In the same example, the relatively rough portion 46 has an axial length approximately 0.75 inch, which is approximately equal to the thickness of the first board 32, and the relatively smooth portion 48 has an axial length of approximately 0.375 inch.

As shown, the nail 10 is driven through the first board 32, and into the second board 34 while the first board 32 engages the second board 34, so that the relatively rough portion 44 extends through at least a substantial part of the given thickness of the first board 32 but does not penetrate the second board 34 to any substantial depth. Thus, the boards 32, 34, are assembled to each other by means of nail 10 with the first board 32 engaging the second board 34. The relatively rough portion 46 tends to prevent the first board 32 from separating from the second board even though the head 36 is spaced from the first board 32. The nail 10 can be easily pulled or removed from the boards 32, 34, by means of suitable tool, such as, for example, a crowbar (not shown) or a claw (not shown) upon a hammer head, when it is desired to disassemble the boards 32, 34. Such a tool can be easily inserted between the first board 32 and the head 36.

The relatively rough portion 46 of the shank 40 is formed with a plurality of annular rings 50 defining a plurality of annullar grooves 52. Each of the rings 50 is frusto-conical, as shown, so as to have an end of larger diameter and end of smaller diameter. Each of the rings 50 is regarded as pointing axially from its end of larger diameter toward its end of smaller diameter. The pointed end 42 and the rings 50 point, as shown in accordance with the embodiment of FIG. 3, in opposite axial directions.

Figure 4:
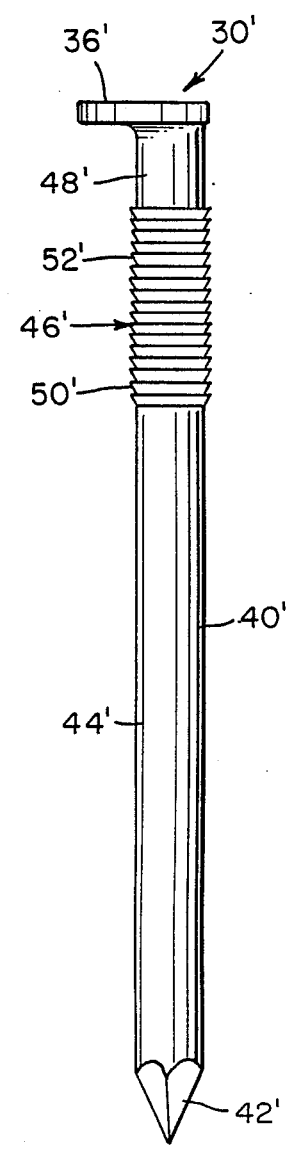
FIG. 4 is an elevational view of a nail constituting an alternative embodiment of this invention.

As shown in FIG. 4, a nail 30' consituting an alternative embodiment of this invention is similar to the nail 30 in that the same has a single head 36', which is D-shaped, and a shank 40' defining a longitudinal axis and having a pointed end 42'. The shank 40' has relatively smooth portion 44', a relatively portion 46' and a relatively smooth portion 48'.

The relatively rough portion 46' of the shank 40' is formed with a plurality of annular rings 50' defining a plurality of annular grooves 52'. Each of the rings 50' is frusto-conical, as shown, so as to have an end of larger diameter and an end of smaller diameter. Each of the rings 50' is regarded as pointing axially from its end of larger diameter toward its end of smaller diameter. The pointed end 42' and the rings 50' point, as shown, in a common axial direction.

Except that the pointed end 42' and the rings 50' point axial direction, the nail 30' is similar to the nail 30 and functions similarly.

The shank of either nail described above as embodying this invention may be optionally coated, as with a coating materials used upon convention nails, so as to increase its holding capabilities.

Other modifications may also be made without departing from the scope and spirit of this invention which is defined by means of the appended claims, it therefore being realized that the present invention may be practiced otherwise than as specifically described herein.

I claim:

1. In combination with first and second boards to be secured together by means of a nail, said nail comprising:
a head; and
a shank having a pointed end for defining holes within said first and second boards as said nail is insertedly driven into said first and second boards; said shank having a first relatively smooth portion extending axially from said pointed end and terminating so as to be axially spaced from said head; a relatively rough portion extending axially from said first relatively smooth portion toward said head and terminating so as to be axially spaced from said head, said relatively rough portion being substantially non-deformable with respect to said first and second boards and having an axial length which is substantially equal to the thickness of one of said first and second boards within which said relatively rough portion will be disposed when said first relatively smooth portion will be disposed within said other one of said first and second boards whereby said first relatively smooth and relatively rough portions constitute means providing said nail with differential holding capabilities per unit length along said shank when said nail is insertedly driven into said first and second boards; and a second relatively smooth portion extending axially from said relatively rough portion to said head such that said second relatively smooth portion extends outwardly from said one of said first and second boards when said nail is insertedly driven into said first and second boards so as to provide a means for spacing said head from said one of said first and second boards whereby a tool can grasp said nail between said one of said first and second boards and said head for removal of said nail from said first and second boards when desired.

2. The combination of claim 1 wherein the relatively rough portion is formed with a plurality of annular rings defining a plurality of annular rings defining a pluratlity of annular grooves.

3. The combination of claim 2 wherein the rings are frusto-conical.

4. The combination of claim 3 wherein the pointed end and the frusto-conical rings point in opposite axial directions.

5. The combination of claim 4 wherein the first relatively smooth portion extending axially from the pointed end has an axial length greater than the combined axial lengths of the relatively rough portion and the second relatively smooth portion extending axially between the rings and the head.

6. The combination of claim 3 wherein the pointed end and the frusto-conical rings point in a common axial direction.

7. The combination of claim 6 wherein the first relatively smooth portion extending axially from the pointed end has an axial length greater than the combined axial lengths of the relatively rough portion and the second relatively rough portion and the head.

8. The combination as set forth in claim 1, wherein:
said head has a substantially D-shaped configuration.

9. In combination with first and second boards to be secured together by means of a nail to be initially driven through a first one of said first and second boards having a predetermined thickness, and into a second one of said first and second boards so as to assemble said first and second boards with said first and second boards engaging each other, and to be subsequently pulled form said first and second boards by means of a tool so as to dissassemble said first and second boards with respect to each other, said nail comprising:
a head; and
a shank having a pointed end for defining holes within said first and second boards as said nail is insertedly driven into said first and second boards; said shank having a first relatively smooth portion extending axially from said pointed end and terminating so as to be axially spaced from said head by means of a distance greater than said predetermined thickness of first one of said first and second boards; a relatively rough portion extending axially from said first relatively smooth portion toward said head for a predetermined distance substantially equal to said predetermined thickness of said first one of said first and second boards and terminating so as to be axially spaced from said head, said relatively rough portion being substantially non-deformable with respect to said first and second boards; and a second relatively smooth portion extending axially from said relatively rough portion to said head such that said second relatively smooth portion extends outwardly from said first one of said first and second boards when said nail is insertedly driven into said first and second boards so as to provide a means for spacing said head from said first one of said first and second boards,
whereby when said nail is driven through said first one of said first and second boards, and into said second one of said first and second boards while said first board engages said second board, so that said relatively rough poriton extends through a substantial part of said first board but does not penetrate said second board to any substantial degree, and so that said head remains spaced form said first one of said first and second boards, said boards are assembled to each other by said nail with said first board engaging second board, said relatively rough portion tends to prevent said board from separating from said second board even though said head is spaced from said first board, and said nail can be easily pulled from said boards by means of said tool inserted within said space defined between said head and said first one of said first and second boards when it is desired to disassemble said boards.

10. The combination of claim 9 wherein the relatively rough portion is formed with a pluality of annullar rings defining a plurality of annular grooves.

11. The combination of claim 10 wherein said rings are frusto-conical.

12. The combination of claim 11 wherein the pointed end and the rings point in opposite axial directions.

13. The combination of claim 12 wherein the rings of the relatively rough portion extends axially for a distance equal approximately to the thickness of the first board.

14. The combination of claim 11 wherein the pointed end and the rings point in a common axial direction.

15. The combination of claim 14 wherein the rings of the relatively rough portion extends axially for a distance equal approximately to the thickness of the first board.

16. The combination as set forth in claim 9 wherein: said head has a substantially D-shaped configuration.

* * * * *